United States Patent
Modi et al.

(10) Patent No.: US 11,055,346 B2
(45) Date of Patent: Jul. 6, 2021

(54) TAGGING AN IMAGE WITH AUDIO-RELATED METADATA

(71) Applicant: Gracenote, Inc., Emeryville, CA (US)

(72) Inventors: Nisarg A. Modi, San Ramon, CA (US); Brian T. Hamilton, Hillsborough, CA (US)

(73) Assignee: GRACENOTE, INC., Emeryville, CA (US)

( * ) Notice: Subject to any disclaimer, the term of this patent is extended or adjusted under 35 U.S.C. 154(b) by 0 days.

(21) Appl. No.: 16/516,053

(22) Filed: Jul. 18, 2019

(65) Prior Publication Data
US 2020/0042553 A1    Feb. 6, 2020

Related U.S. Application Data

(60) Provisional application No. 62/714,625, filed on Aug. 3, 2018.

(51) Int. Cl.
*G06F 3/048* (2013.01)
*G06F 16/683* (2019.01)
(Continued)

(52) U.S. Cl.
CPC .......... *G06F 16/685* (2019.01); *G06F 16/686* (2019.01); *G06F 16/7834* (2019.01); *H04N 5/23218* (2018.08)

(58) Field of Classification Search
CPC .......... G06F 3/16; G06F 16/58; H04N 5/772; H04N 21/4223; H04N 1/2112; H04N 2201/0084; H04N 5/23222; H04N 7/188; H04N 9/8211; H04N 5/232933; H04N 5/23216; H04N 5/23293; H04N 5/23296; H04N 5/232945
See application file for complete search history.

(56) References Cited

U.S. PATENT DOCUMENTS 10,270,967 B1 *  4/2019  Thorn ................... G06F 21/566
10,327,063 B1 *  6/2019  Gorny ................... H04R 1/086
(Continued)

FOREIGN PATENT DOCUMENTS

GB         2375907 A    11/2002
KR    1020140089771 A     7/2014
(Continued)

OTHER PUBLICATIONS

Lahti et al., Audio and Image browswe for Mobile Deivices; Jan. 4, 2008; IEEE; 3 pages.*
(Continued)

*Primary Examiner* — Linh K Pham
(74) *Attorney, Agent, or Firm* — McDonnell Boehnen Hulbert & Berghoff LLP

(57) ABSTRACT

In one aspect, an example method to be performed by a computing device includes (a) receiving a request to use a camera of the computing device; (b) in response to receiving the request, (i) using a microphone of the computing device to capture audio content and (ii) using the camera of the computing device to capture an image; (c) identifying reference audio content that has at least a threshold extent of similarity with the captured audio content; and (d) outputting an indication of the identified reference audio content while displaying the captured image.

20 Claims, 6 Drawing Sheets

(51) Int. Cl.
*H04N 5/232* (2006.01)
*G06F 16/783* (2019.01)
*G06F 16/68* (2019.01)

(56) References Cited

U.S. PATENT DOCUMENTS

| | | | |
|---|---|---|---|
| 2006/0092291 A1* | 5/2006 | Bodie | H04N 1/00307 348/231.99 |
| 2007/0081796 A1* | 4/2007 | Fredlund | G03B 31/06 386/225 |
| 2007/0182822 A1* | 8/2007 | Hale | H04N 21/854 348/207.99 |
| 2011/0078729 A1* | 3/2011 | LaJoie | H04N 21/254 725/36 |
| 2011/0115612 A1* | 5/2011 | Kulinets | H04N 5/232 340/10.42 |
| 2011/0165888 A1* | 7/2011 | Shuman | G06F 16/487 455/456.1 |
| 2011/0193964 A1* | 8/2011 | McLeod | H04N 7/20 348/158 |
| 2012/0251082 A1* | 10/2012 | De Vos | H04N 9/8211 386/285 |
| 2013/0342731 A1* | 12/2013 | Lee | H04N 9/8211 348/231.4 |
| 2014/0089307 A1* | 3/2014 | Garside | G06F 16/738 707/736 |
| 2014/0161263 A1* | 6/2014 | Koishida | G06F 16/683 381/56 |
| 2014/0172429 A1* | 6/2014 | Butcher | G10L 25/54 704/270 |
| 2014/0192230 A1* | 7/2014 | Chang | H04N 1/2112 348/231.4 |
| 2016/0100097 A1* | 4/2016 | Chaudhry | H04N 5/23293 348/333.02 |
| 2016/0100149 A1 | 4/2016 | Sharma et al. | |
| 2016/0379274 A1* | 12/2016 | Irwin | G06Q 30/0271 705/14.67 |
| 2017/0064262 A1* | 3/2017 | Mozer | G08B 13/19695 |
| 2017/0134688 A1* | 5/2017 | Yoon | G06F 16/433 |
| 2018/0335848 A1* | 11/2018 | Moussette | G06F 3/04842 |
| 2019/0320114 A1* | 10/2019 | Lee | H04N 5/23238 |

FOREIGN PATENT DOCUMENTS

| | | |
|---|---|---|
| KR | 201400114238 A | 9/2014 |
| KR | 1020170054868 A | 5/2017 |

OTHER PUBLICATIONS

Evangelopoulos et al.; Video Event Detection and Summarization Using Audio, Visual and Text Saliency; © 2009 IEEE; 4 pages.*
International Search Report dated Nov. 8, 2019 issued in connection with International Application No. PCT/US2019/043089, filed on Jul. 23, 2019, 3 pages.
Written Opinion of the International Searching Authority dated Nov. 8, 2019 issued in connection with International Application No. PCT/US2019/043089, filed on Jul. 23, 2019, 5 pages.

* cited by examiner

TAGGING AN IMAGE WITH AUDIO-RELATED METADATA

CROSS-REFERENCE TO RELATED APPLICATIONS

This application claims priority to U.S. Provisional Patent Application No. 62/714,625, filed on Aug. 3, 2018, which is hereby incorporated by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

INTRODUCTION

As the technology surrounding image-capturing computing devices continues to evolve, users of these devices expect more and more functionality from these devices, as well as from their experiences in using them. When coupled with the increasing connectivity between these users (e.g., through social media), a holistic, informed experience with the captured image can be important to the user and those with whom the user connects. Thus, methods and systems for improving the user experience when capturing images are provided herein.

SUMMARY

In one aspect, an example computing device is disclosed. The computing device comprises (a) a camera, (b) a microphone, (c) one or more processors, and (d) a non-transitory, computer-readable medium storing instructions that, when executed by the one or more processors, cause the computing device to perform a set of acts comprising: (i) receiving a request to use the camera of the computing device; (ii) in response to receiving the request, using the microphone of the computing device to capture audio content and using the camera of the computing device to capture an image; (iii) identifying reference audio content that has at least a threshold extent of similarity with the captured audio content; and (iv) outputting an indication of the identified reference audio content while displaying the captured image.

In another aspect, an example method to be performed by a computing device is disclosed. The method includes (a) receiving a request to use a camera of the computing device; (b) in response to receiving the request, (i) using a microphone of the computing device to capture audio content and (ii) using the camera of the computing device to capture an image; (c) identifying reference audio content that has at least a threshold extent of similarity with the captured audio content; and (d) outputting an indication of the identified reference audio content while displaying the captured image.

In another aspect, an example non-transitory computer-readable medium is disclosed. The computer-readable medium has stored thereon program instructions that, upon execution by a computing system, cause the computing system to perform a set of operations comprising (a) receiving a request to use a camera of a computing device; (b) in response to receiving the request, (i) using a microphone of the computing device to capture audio content and (ii) using the camera of the computing device to capture an image; (c) identifying reference audio content that has at least a threshold extent of similarity with the captured audio content; and (d) outputting an indication of the identified reference audio content while displaying the captured image.

DETAILED DESCRIPTION

I. Overview

Figure 1:
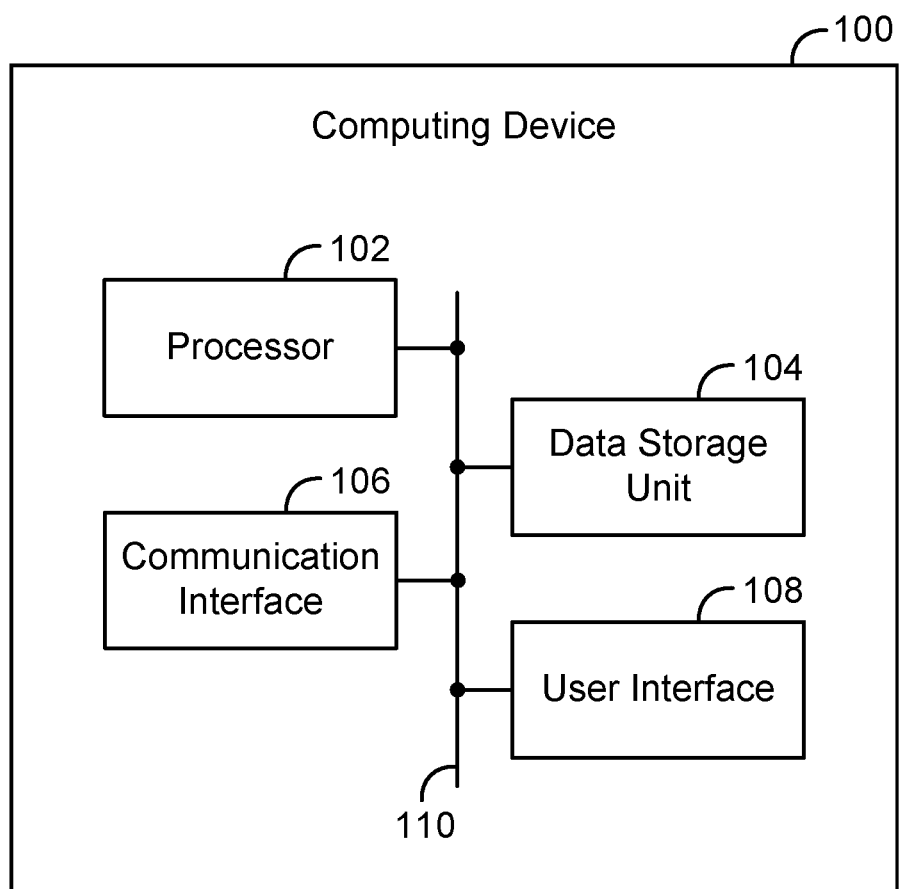
FIG. 1 is a simplified block diagram of an example computing device.

People capture and review images using image-capturing computing devices (e.g., smartphones, laptop computers, etc.) that are equipped with a host of capabilities, but in a fashion that may not adequately take into account the environmental factors and context surrounding the captured image. For example, to improve the user's opportunity to capture a desirable image, computing devices may provide the user with a short burst of images taken before and/or after the intended image capture. Geolocation and/or time-stamp information may also be associated with the captured image to inform the user when and where the image was captured. Doing so, however, may only improve the user's experience in terms of the image itself, and may not adequately represent the context or environment in which the image was captured.

With the above arrangements, the user may only be as engaged with the image as the image itself warrants, regardless of a variety of environmental factors that might have been occurring at the time the image was captured.

Disclosed herein are methods and systems to address these and potentially other issues. In an example method, a computing device can capture an image in an environment where audio content is being played. At or around the time the image is captured, the computing device can also capture the audio content playing in the environment and identify various information about the captured audio content.

The computing device can identify information about the audio content in various ways. For instance, the computing device can determine an audio fingerprint associated with the audio content, transmit the fingerprint to a server and, in response, receive metadata associated with the fingerprint from the server. In another aspect, the computing device can send the captured audio content (or a portion thereof) to a server, and the server can generate an audio fingerprint of the audio content. The server can then identify metadata associated with the fingerprint and transmit the identified metadata to the computing device. In any case, once the computing device obtains the metadata, the computing device may associate the metadata with the image and store the image and the associated metadata for further use.

In one example, when the stored image is selected for viewing, the computing device can use the associated metadata to display a GUI displaying information contained in the metadata and associated with the audio content. The metadata may indicate an artist, song title, album title, album cover, genre, year of release, or various other identifying information of the audio content. In this manner, by displaying information contained in the metadata when the user views the image, the computing device can provide the user with information identifying the audio content that was playing in the environment of the computing device at the time the image was captured.

In another example, when the image is selected for viewing, the computing device may use the associated metadata to play back a version of the previously captured audio content. For example, as noted above, the metadata can include various identifying information of the audio content, such that the computing device can use the metadata to retrieve and play a version of the identified audio content. The computing device can retrieve the version of the identified audio content from local storage on the computing device or from an audio streaming service. The version may be a studio-recorded version or a live concert version of the audio content, as a sound quality of these versions is likely to be higher than a sound quality of the audio content captured by the computing device. In these examples, the computing device can also display a GUI that allows the user to interact with and control playback of the audio content (e.g., via a "pause" button, volume control slider, etc.), and that displays information contained in the metadata and associated with the audio content, as described above.

II. Example Architecture

A. Computing Device

FIG. 1 is a simplified block diagram of an example computing device 100. Computing device 100 can perform various acts and/or functions, such as those described in this disclosure. Computing device 100 can include various components, such as processor 102, data storage unit 104, communication interface 106, and/or user interface 108. These components can be connected to each other (or to another device, system, or other entity) via connection mechanism 110.

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 can be configured to perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108. Data storage unit 104 can also store other types of data, such as those types described in this disclosure.

Communication interface 106 can allow computing device 100 to connect to and/or communicate with another other entity according to one or more protocols. In one example, communication interface 106 can be a wired interface, such as an Ethernet interface or a high-definition serial-digital-interface (HD-SDI). In another example, communication interface 106 can be a wireless interface, such as a cellular or WI-FI interface. In this disclosure, a connection can be a direct connection or an indirect connection, the latter being a connection that passes through and/or traverses one or more entities, such as such as a router, switcher, or other network device. Likewise, in this disclosure, a transmission can be a direct transmission or an indirect transmission.

User interface 108 can facilitate interaction between computing device 100 and a user of computing device 100, if applicable. As such, user interface 108 can include input components such as a keyboard, a keypad, a mouse, a touch-sensitive panel, a microphone, a camera, and/or a movement sensor, all of which can be used to obtain data indicative of an environment of computing device 100, and/or output components such as a display device (which, for example, can be combined with a touch-sensitive panel), a sound speaker, and/or a haptic feedback system. More generally, user interface 108 can include hardware and/or software components that facilitate interaction between computing device 100 and the user of the computing device 100.

Computing device 100 can take various forms, such as a workstation terminal, a desktop computer, a laptop, a tablet, a mobile phone, or a television.

III. Example Operations

As described above, a computing device can include a camera, and a user of the computing device can use the camera to capture various images. For instance, the user can use the camera to take a photograph of family, friends, or any scene that the user would like to memorialize. While a computing device is capturing an image, audio content may be playing in an environment surrounding the computing device (e.g., music playing in a restaurant, shopping mall, etc.). As described in further detail below, the computing device can identify the audio content playing in the environment and subsequently display an indication of the audio content when the user goes to view the captured image.

At or around the time the computing device captures the image, the computing device can also determine a fingerprint associated with the audio content. For instance, the computing device can generate a fingerprint from a portion of audio content that is playing at or around the time the computing device is capturing the image.

To determine the fingerprint associated with the audio content, the computing device can capture audio content from the environment of the computing device at or around the time the image is captured, and the computing device can do so in a number of ways. For example, using one or more microphones of the computing device, the computing device can capture audio content that is being played at the same time the image is captured, such as over a period of time during which the image is captured (e.g., over a time period that begins or ends when the image is captured or during a time period comprising a short burst of images taken before and/or after the intended image capture). Alternatively, the computing device can capture audio content from the environment just before the image is captured or just after the image is captured (e.g., during a period of time when a camera application is running on the computing device, but not when the image itself is captured).

In one example, the computing device may be configured to detect that a user is preparing to capture an image (e.g., by opening a camera application on a smartphone) and, in response, begin capturing audio content that is being played in the environment of the computing device using one or more microphones on the computing device. In a further aspect, the computing device may also be configured to detect that the user is preparing to cease capturing an image (e.g., by closing the previously opened "Camera" application on the smartphone) and, in response, discontinue capturing the audio content that is being played in the environment around the computing device.

In another example, the computing device may be configured to continuously monitor audio content that is being played in the environment of the computing device during background processing and begin capturing the audio only upon recognizing one or more predetermined phrases (e.g., "Let's get a picture together!"). In this way, while the audio content that is being played in the environment around the computing device is continuously monitored for engagement by the user, the audio content may only be captured upon such engagement.

In yet another example, the computing device may be configured to continuously monitor the audio content that is being played in the environment around the computing device and periodically (as opposed to responsively) capture the audio content for further analysis. In some examples, the computing device may periodically capture the audio content and perform audio analysis (e.g., fingerprinting, finding other audio content that matches the captured audio content, etc.) in real time or near real time. In other examples, however, the computing device may periodically capture the audio content and defer audio analysis until a later time using one or more methods (e.g., by timestamping the captured audio content and, at a later time, matching it with a captured image with a same (or similar) timestamp).

In yet another example, the computing device may be configured to capture audio content that is being played in the environment around the computing device using one or more microphones of the computing device as part of video captured by the computing device, which typically contains both audio and visual data. In a further aspect, the computing device may separate the audio content from the captured video after the video is captured (e.g., by extracting the audio content from the video file).

In any case, the computing device can determine a fingerprint for the captured audio content. The computing device can determine the fingerprint according to any audio fingerprinting process now known or later developed. In some examples, the computing device itself can generate the audio fingerprint data based on the captured audio content, or the computing device can send the captured audio content (or a portion thereof) to another computing device, such as a network server, that can generate the audio fingerprint data based on the captured audio content.

Further, in some examples, the computing device can determine the fingerprint based on captured audio content in real time. In other examples, the computing device can determine the fingerprint at a later time.

Once the audio fingerprint data has been determined, however, the audio fingerprint data can be used to identify the audio content that was played at or around the time the image was captured. For instance, the computing device or the network server can compare the audio fingerprint data with reference audio fingerprint data representing audio content of known media (e.g., of known songs).

The computing device, the network server, or other such entities could establish or otherwise have access to reference audio fingerprint data representing the known media. For instance, the server could receive various songs and, for each song, could generate respective reference audio fingerprints representing the respective songs. Or the server could otherwise establish or be provisioned with these reference audio fingerprints. In any case, the reference fingerprints can be generated according to any audio fingerprinting process now known or later developed. The server can further associate each reference audio fingerprint with information identifying the audio content that corresponds to the reference audio fingerprint. For instance, each reference audio fingerprint can be associated with a song title, artist, genre, album title, release year, or various other information describing the audio content.

The computing device can query the server with the audio fingerprint data that was generated based on the audio content captured played at or around the time the image was captured, and the server can compare the query audio fingerprint data with the reference audio fingerprint data of the known media. And if the server thereby determines with sufficient confidence that the query audio fingerprint data matches particular reference audio fingerprint data, then the server could conclude that the audio content played at or around the time the image is captured and captured by the computing device is the known media represented by the particular reference audio fingerprint data. Further, upon coming to such a conclusion, the server could transmit, to the computing device, the descriptive information associated with the media represented by the particular reference audio fingerprint data (e.g., the title, artist, genre, album title, and/or release year of the audio content).

In other examples, the computing device may perform some or all of these functions locally, on the computing device itself.

In any event, the computing device can store the descriptive information of the audio content (or at least some portion thereof) as metadata associated with the image. And when a user subsequently views or otherwise accesses the image via the computing device, the computing device can use the metadata associated with the image to perform various functions.

In one example, the functions performed by the computing device may include, responsive to the image being selected for viewing, using the associated metadata to display a GUI displaying information contained in the metadata and associated with the audio content (e.g., the name of the song and/or artist in the audio content). Such displayed information can provide the user with further context for the environment in which the image was captured and may increase the user's engagement with the image, the user's inclination to share and discuss the image, and/or the user's inclination to play or download the audio content (while viewing the image or otherwise).

In another example, responsive to the image being selected for viewing, the computing device can use the associated metadata to play back the audio content that was playing in the computing device's environment at the time the image was captured. For instance, the computing device can use the associated metadata to determine which song was playing in the environment, and the computing device can then retrieve and play the determined song. In some examples, the song may be locally stored on the computing device, and so the computing device may play the locally stored song. In other examples, the computing device can play back the song using an audio streaming service. In yet other examples, the computing device may only store a small portion of data associated with the captured audio content, the captured image, and/or both, and stream and/or retrieve other types of data associated with the audio content from various sources (e.g., network servers), only after the image is selected for viewing. Other examples are possible as well.

In any case, before or pursuant to playing back the audio content, the computing device can also display a GUI that allows the user to interact with and control the audio content that is being played via the computing device (e.g., a "pause" button, volume control slider, etc.). In a further aspect, the computing device can also display a GUI displaying information contained in the metadata and associated with the audio content (e.g., the name of the artist, album title, or album cover associated with the audio content).

A. Example GUIs and Operational Environments

To further illustrate the above-described concepts and others, FIGS. 2A-2D depict example GUIs that a computing device 200 can be configured to display based on example operating environments of the computing device 200. The computing device 200 can be similar or the same as the computing device 100 depicted in FIG. 1. In the present examples, the computing device 200 is depicted as a mobile computing device, but can take other forms in other examples. Further, the example environments and GUIs depicted in FIGS. 2A-2D are merely for purposes of illustration. The features described herein can involve environments, operations, GUIs, and functionalities that are configured or formatted differently, include additional or fewer components and/or more or less data, include different types of components and/or data, and relate to one another in different ways.

Figure 2A:
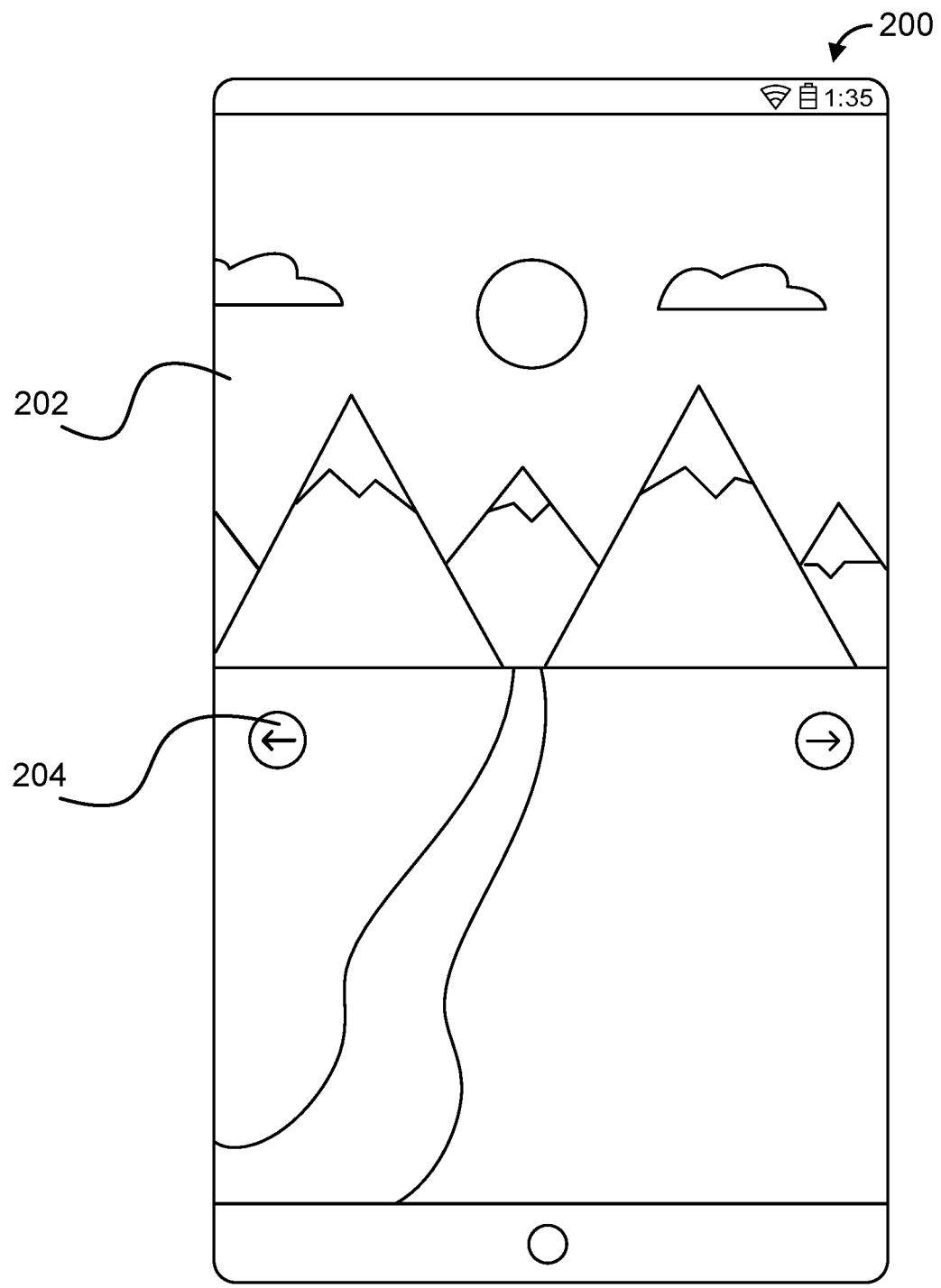
FIG. 2A is an example graphical user interface ("GUI") in a first state.

FIG. 2A depicts an example GUI of the mobile computing device 200 in a first state. Specifically, in this first state, the mobile computing device 200 displays an image 202 (here, an image depicting a mountain range, skyline, and winding road) captured by a camera of the mobile computing device 200. The image 202 can be one of multiple previously-captured images viewable via a photo gallery of the mobile computing device 200. For instance, as shown, the mobile computing device 200 can display a scroll icon 204, and responsive to receiving a selection of the scroll icon 204, the mobile computing device 200 can alter the GUI to display other ones of the previously-captured images (e.g., by scrolling the images left or right).

In line with the discussion above, at or around the time the mobile computing device 200 captures image 202, the mobile computing device 200 can also capture audio content from its environment (and can do so in a number of ways). In one example, the mobile computing device 200 can receive a request to use a camera of the mobile computing device 200 and, in response, use one or more microphones on the mobile computing device 200 to capture audio content playing in the surrounding environment at or around the same time the image is captured. The mobile computing device 200 may also capture this audio over a period of time during which the image is captured (e.g., just before the image is captured, just after the image is captured, and/or during other time periods surrounding the capture of the image).

The mobile computing device 200 can receive a request to use a camera on the device in various ways. For example, receiving the request to use the camera can involve the mobile computing device 200 detecting that a user is preparing to capture an image (e.g., by receiving a request to launch a camera application of the mobile computing device, by receiving a request to capture an image, etc.). In another example, the mobile computing device 200 can continuously (or periodically) monitor audio content that is being played in the environment of the computing device and begin capturing the audio only upon recognizing one or more predetermined phrases that indicate that the user is preparing to capture an image (e.g., "Let's get a picture together!"). In this way, the audio content in the environment around the mobile computing device 200 can be continuously monitored for purposes of determining that the user is preparing to capture an image.

In another example, the mobile computing device 200 can periodically monitor and/or capture audio content and associate some of the captured audio content with the image 202 based on timing information of the captured audio content. For example, the mobile computing device 200 can capture audio content periodically (e.g., record 1 second of audio content every 30 seconds), associate time data with that captured audio content (e.g., a timestamp), and then associate the captured audio data (and/or data pertaining to the captured audio content) with the image 202 at a later time based on shared (or similar) time data between the captured audio and the image 202. Other examples are possible.

Figure 2B:
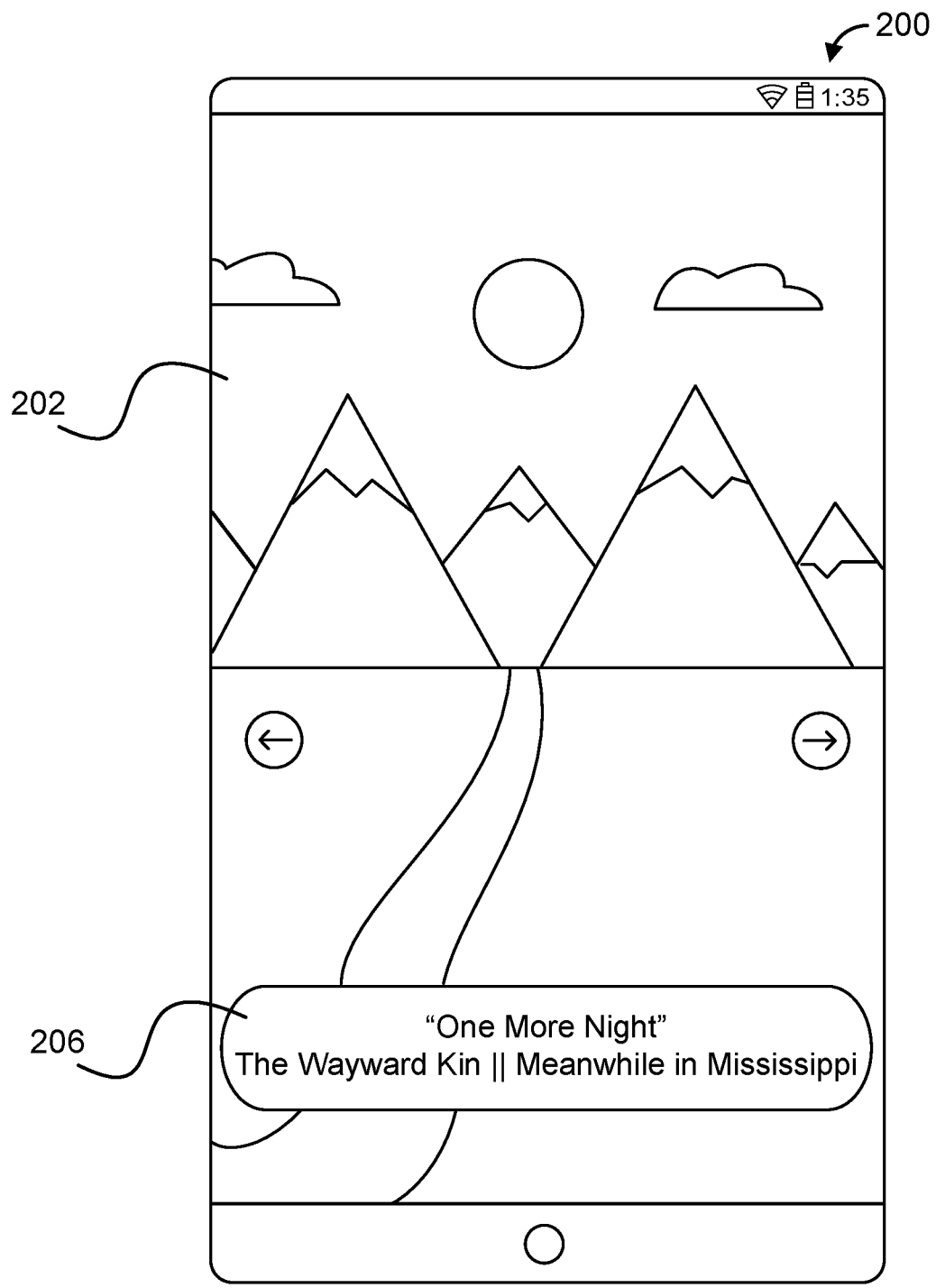
FIG. 2B is the example GUI of FIG. 2A, but in a second state.

Turning to FIG. 2B, FIG. 2B depicts the GUI of mobile computing device 200 depicted in FIG. 2A, but in a second state. Specifically, in FIG. 2B, the mobile computing device 200 has captured audio content and used the captured audio content to identify reference audio content that has at least a threshold extent of similarity with the captured audio content. Then, based on the results of this comparison, the mobile computing device 200 can display metadata associated with this reference audio content, shown here as an overlay 206 on the GUI.

The mobile computing device 200 can use the captured audio content to identify reference audio content in a number of ways. In one example, the mobile computing device 200 itself can generate audio fingerprint data based on the captured audio content (e.g., by processing the captured audio content locally) and then send the generated audio fingerprint data to a second computing device (e.g., a network server) with an instruction that causes the second computing device to compare the generated audio fingerprint data to a plurality of reference audio fingerprint items. Once the second computing device performs this comparison, the mobile computing device 200 can receive, from the second computing device, an indication of a particular reference audio fingerprint item that has at least a threshold extent of similarity with the generated audio fingerprint data. This similarity may indicate a match between the captured audio content and known reference audio content, thereby allowing the mobile computing device 200 to display information about the captured audio content based on its similarity to the known reference audio content.

In another example, the mobile computing device 200 can identify the reference audio content locally by generating audio fingerprint data of the captured audio content and comparing the generated audio fingerprint data to a plurality of locally stored reference audio fingerprint items, each of which are associated with respective reference audio content. Then, based on this comparison, the mobile computing device 200 can also determine that a particular reference audio fingerprint item has at least a threshold extent of similarity with the generated audio fingerprint data.

In yet another example, the mobile computing device 200 can send a portion of the captured audio content to a second computing device (e.g., a network server) with an instruction that causes the second computing device to compare, at least, the portion of the captured audio content to the plurality of reference audio content items. Such a comparison can involve the second computing device generating an audio fingerprint of the portion of the captured audio content and comparing the generated audio fingerprint to respective reference audio fingerprints, each of which can correspond to a respective reference audio content item. Then, once the second computing device performs this comparison, mobile computing device 200 may receive, from the second computing device, an indication of a particular reference audio content item that has at least the threshold extent of similarity with the captured audio content.

In some examples, the mobile computing device 200 can identify metadata associated with the reference audio content that has at least the threshold extent of similarity with the generated audio fingerprint data. For instance, in the above examples, the plurality of reference audio content items can each include or otherwise be associated with respective metadata. As such, the mobile computing device 200 can identify the respective metadata included in or associated with the reference audio content item that has at least the threshold extent of similarity with the generated audio fingerprint data. The metadata can include various information identifying its associated reference audio content. For instance, the metadata can include a song title, artist, genre, album title, release year, or various other information for the reference audio content.

Further, the mobile computing device 200 can use this identified metadata associated with the identified reference audio content item in a number of ways. In one example, the mobile computing device 200 can store the metadata in association with a captured image. In particular, the mobile computing device 200 can store the metadata in association with the image that the mobile computing device 200 captured at or around the time the mobile computing device 200 captured the audio content that was used to identify the metadata.

The mobile computing device 200 can be configured to display the metadata concurrently with the associated captured image. For example, as shown in FIG. 2B, once the image 202 is selected for viewing, the mobile computing device 200 can display the metadata associated with the image 202 as the overlay 206. In this manner, when a user views the image 202 on the mobile computing device 200, such as by scrolling through images in a photo gallery stored on the mobile computing device 200, the metadata associated with the identified reference audio content is displayed concurrently with the image 202. And because the identified reference audio content has at least the threshold extent of similarity with the captured audio content from the environment of the mobile computing device 200 at or around the time the image 202 was captured, this displayed metadata can provide identifying information of that audio content from the environment of the mobile computing device 200. As noted above, this metadata may be displayed as metadata indicating a song title (here, "One More Night"), artist (here, "The Wayward Kin"), and/or album title (here, "Meanwhile in Mississippi") associated with the identified reference audio content playing at or around the time image 202 was captured, among other possibilities.

Figure 2C:
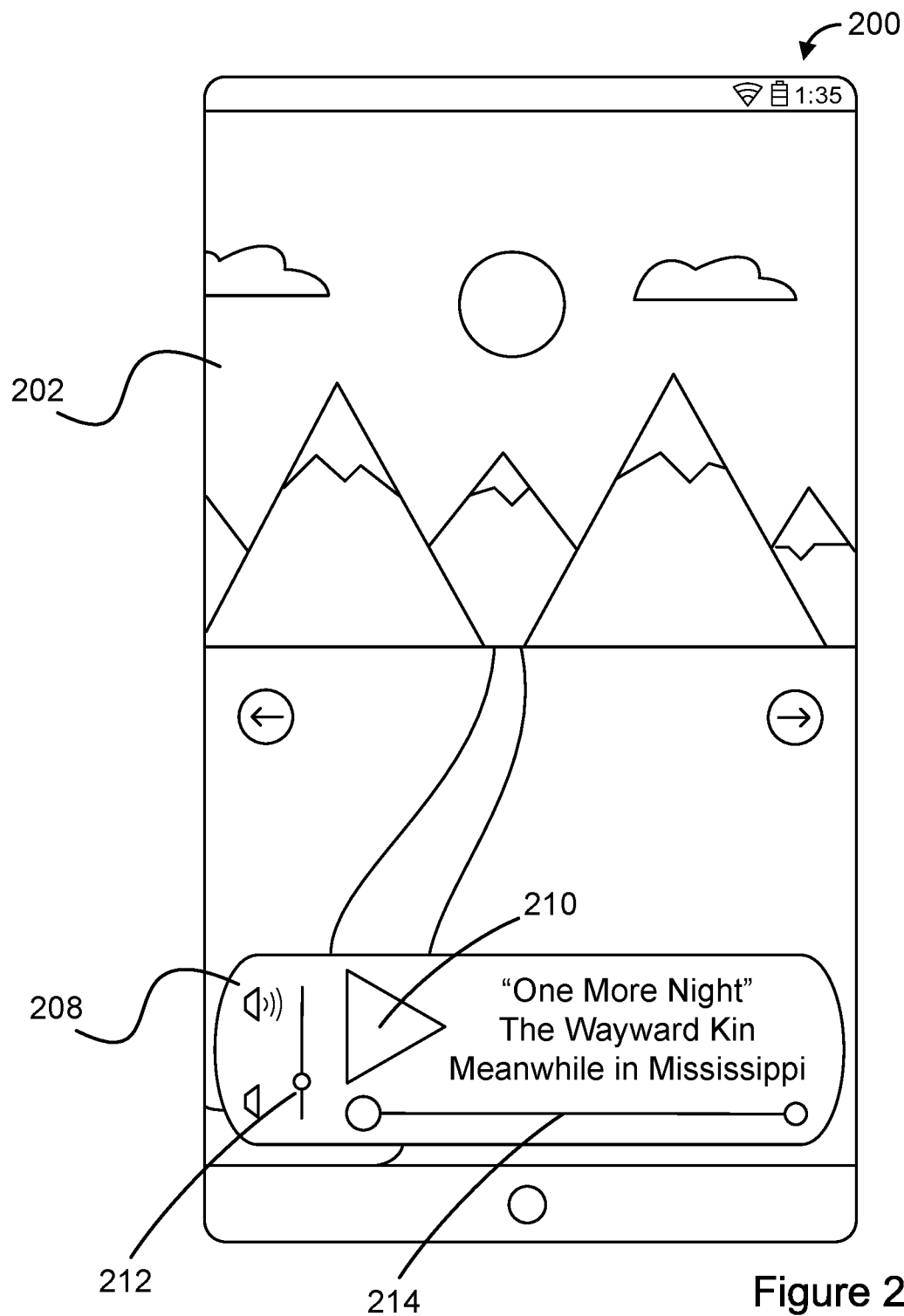
FIG. 2C is the example GUI of FIG. 2A, but in a third state.

Turning to FIG. 2C, the GUI of the mobile computing device 200 is shown in a third state. The third state is similar to the second state depicted in FIG. 2B, in that the mobile computing device 200 has captured audio content, used that captured audio content to identify reference audio content having at least a threshold similarity with the captured audio content, and, based on the results of this comparison, displayed metadata associated with this reference audio content in a GUI. In the third state, however, mobile computing device 200 is configured to play back the identified reference audio content while displaying the image 202.

As shown, in the third state, the GUI can further include audio playback controls 208 that allow the user to interact with and control playback of the identified reference the audio content while viewing the image 202. The audio playback controls 208 can include a play/pause button 210, one or more volume controls 212, and a tracking slider 214 for navigating through playback of the audio content. Other examples are possible as well.

The mobile computing device 200 can be configured to play back the identified reference audio content associated with image 202 in a number of ways. For example, the mobile computing device 200 can use the stored metadata to retrieve and playback the reference audio content. Referring to FIG. 2C, responsive to the mobile computing device 200 receiving a request to display the image 202 (e.g., by a user scrolling to or otherwise selecting the image 202), and/or responsive to the mobile computing device 200 receiving a request to play audio content via the audio playback controls 208, the mobile computing device 200 can retrieve and play back a copy of the reference audio content identified by the metadata associated with the image 202. In the present example, the metadata associated with the image 202 identifies the reference audio content as the song "One More Night" by The Wayward Kin, and so the mobile computing device 200 can retrieve and play back this song responsive to receiving a request to display the image 202. In some examples, the reference audio content identified by the metadata can be stored locally on the mobile computing device 200, and the mobile computing device 200 can retrieve and play back the locally-stored reference audio content. Alternatively, the mobile computing device 200 can retrieve the reference audio content from one or more streaming services (e.g., SPOTIFY®, AMAZON MUSIC®, etc.). By using a streaming service to play back the reference audio content, the mobile computing device 200 can reduce the amount of data that is stored locally and associated with the image 202.

In some examples, the mobile computing device 200 can use an audio fingerprint to retrieve and play back the reference audio content. For instance, as part of the process of identifying the reference audio content that has at least the threshold extent of similarity with the captured audio content, the mobile computing device 200 can locally store an audio fingerprint of the identified reference audio content in association with the image 202. And in order to retrieve the reference audio content for playback, the mobile computing device 200 can query a database of audio fingerprints and corresponding audio content to identify and retrieve audio content that matches the audio fingerprint associated with the image 202. Other examples and functionalities are possible.

Figure 2D:
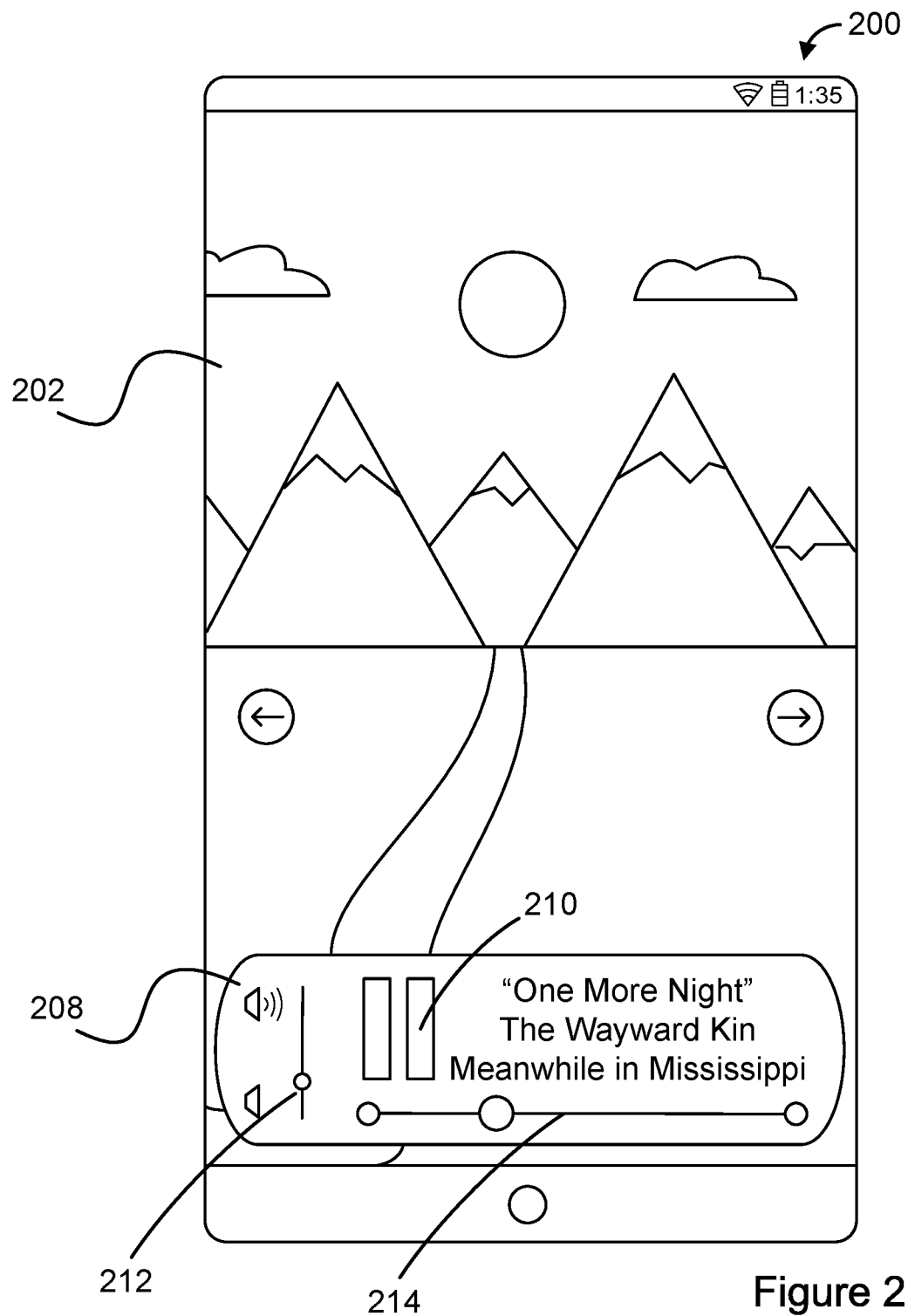
FIG. 2D is the example GUI of FIG. 2A, but in a fourth state.

Turning to FIG. 2D, the GUI of the mobile computing device 200 is shown in a fourth state. The fourth state is similar to the third state depicted in FIG. 2C, in that the mobile computing device 200 has captured audio content, used that captured audio content to identify reference audio content having at least at least a threshold similarity with the captured audio content, and, based on the results of this comparison, displayed metadata associated with this reference audio content in the GUI—including the audio playback controls 208. However, in the fourth state, the mobile computing device 200 is in the process of playing back the reference audio content associated with the image 202, such as in response to a user selecting the image 202 for viewing. And while the mobile computing device 200 plays back the reference audio content, the user can control the playback by interacting with the play/pause button 210, volume controls 212, and the tracking slider 214, as described above in connection with FIG. 2C.

B. Example Methods

Figure 3:
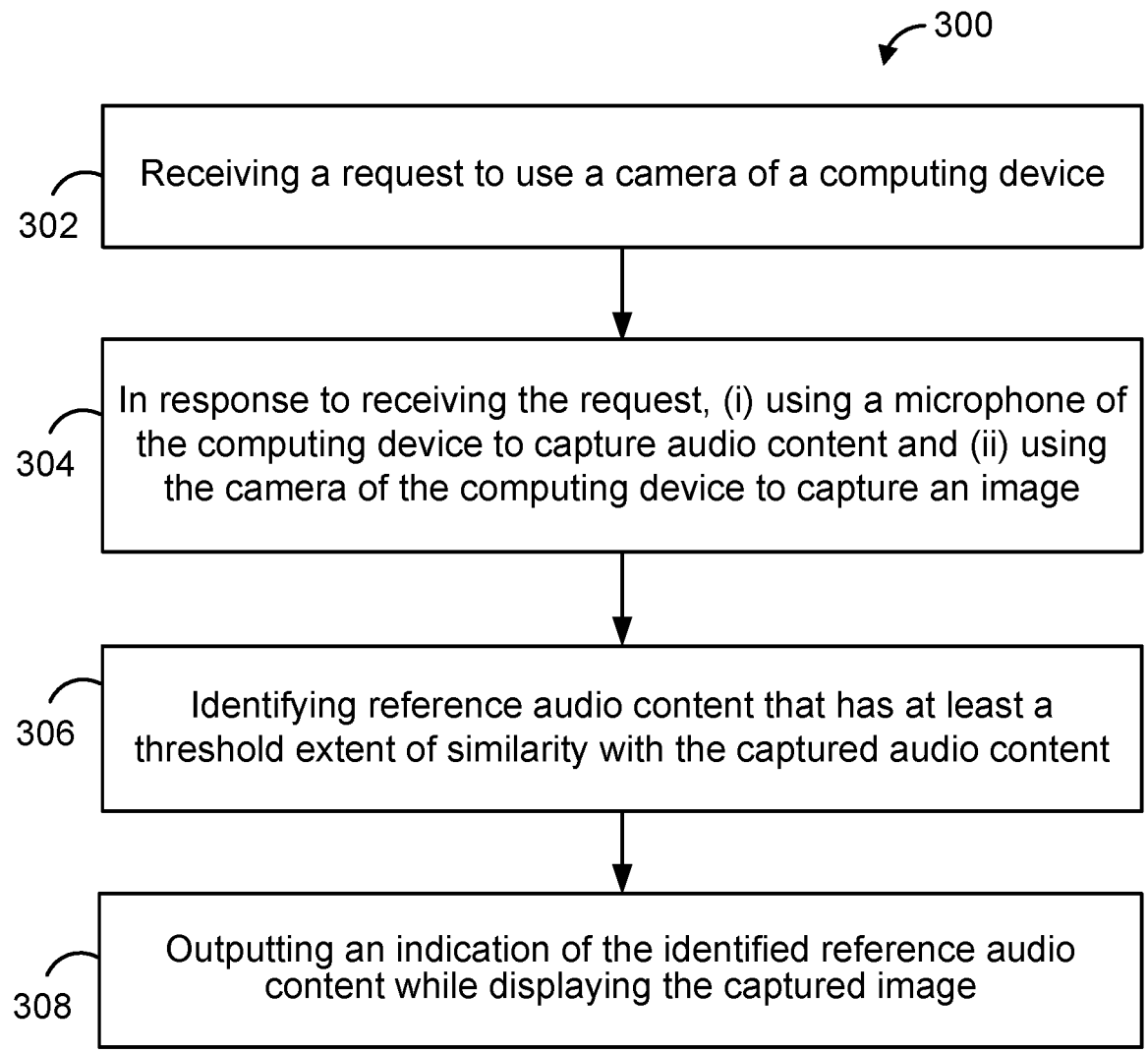
FIG. 3 is a flow chart of an example method.

FIG. 3 is a flow chart illustrating an example method 300.

At block 302, the method 300 can include receiving a request to use a camera of a computing device. In some examples, receiving the request to use the camera of the computing device comprises one or more of (i) receiving a request to launch a camera application of the computing device, such as receiving a user input selecting the camera application, or (ii) receiving a request to capture an image, such as receiving a user input activating a capture function in the camera application.

At block 304, the method 300 can include, in response to receiving the request, (i) using a microphone of the computing device to capture audio content and (ii) using the camera of the computing device to capture an image. In line with the discussion above, using the microphone to capture audio content can involve using the microphone to capture audio content that is playing in an environment of the computing device.

At block 306, the method 300 can include identifying reference audio content that has at least a threshold extent of similarity with the captured audio content. In some examples, the computing device is a first computing device further comprising a communication interface for communicating with a second computing device. The second computing device can include data storage having stored thereon a plurality of reference audio content items. In these examples, identifying the reference audio content that has at least the threshold extent of similarity with the captured audio content can involve sending, to the second computing device, (i) at least a portion of the captured audio content and (ii) an instruction that causes the second computing device to compare at least the portion of the captured audio content to the plurality of reference audio content items. Identifying the reference audio content that has at least the threshold extent of similarity with the captured audio content can further involve receiving, from the second computing device, an indication of a particular reference audio content item of the plurality of reference audio content items that has at least the threshold extent of similarity with the captured audio content.

In other examples, the second computing device can include data storage having stored thereon a plurality of reference audio fingerprint items. In these examples, identifying the reference audio content that has at least the threshold extent of similarity with the captured audio content can involve generating audio fingerprint data of the captured audio content and sending, to the second computing device, (i) the generated audio fingerprint data of the captured audio content and (ii) an instruction that causes the second computing device to compare the generated audio fingerprint data to the plurality of reference audio fingerprint items. Identifying the reference audio content that has at least the threshold extent of similarity with the captured audio content can further involve receiving, from the second computing device, an indication of a particular reference audio fingerprint item of the plurality of reference audio fingerprint items that has at least the threshold extent of similarity with the generated audio fingerprint data.

In still other examples, identifying the reference audio content that has at least the threshold extent of similarity with the captured audio content can involve the computing device generating audio fingerprint data of the captured audio content and comparing the generated audio fingerprint data to a plurality of reference audio fingerprint items, wherein each respective audio fingerprint item is associated with respective reference audio content. The computing device can determine that a particular reference audio fingerprint item of the plurality of reference audio fingerprint items has at least the threshold extent of similarity with the generated audio fingerprint data. And the computing device can identify the reference audio content that has at least the threshold extent of similarity with the captured audio content as the respective reference audio content associated with the particular reference audio fingerprint item.

At block 308, the method 300 can include outputting an indication of the identified reference audio content while displaying the captured image. In some examples, outputting the indication of the identified reference audio content comprises outputting the reference audio content (e.g., playing back audio content via the computing device).

In some examples, the method 300 can also include identifying metadata associated with the identified reference audio content, wherein outputting the indication of the identified reference audio content comprises displaying an indication of the metadata associated with the identified reference audio content. The metadata can include one or more of (i) a song title, (ii) an artist, (iii) a genre, (iv) an album title, or (v) a release year.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects.

We claim:

1. A computing device, comprising:
   a camera;
   a microphone;

one or more processors; and a non-transitory, computer-readable medium storing instructions that, when executed by the one or more processors, cause the computing device to perform a set of acts comprising:

detecting one or more predetermined phrases indicating a request to capture an image;

in response to detecting the one or more predetermined phrases indicating a request to capture an image, using the microphone of the computing device to capture audio content receiving a request to use the camera of the computing device;

in response to receiving the request, using the camera of the computing device to capture an image;

generating audio fingerprint data of the captured audio content;

storing the audio fingerprint data with the captured image on the computing device;

receiving a user input representing a selection of the captured image on the computing device;

in response to receiving the user input, using the stored audio fingerprint data to identify reference audio content that has at least a threshold extent of similarity with the captured audio content; and outputting an indication of the identified reference audio content while displaying the captured image.

2. The computing device of claim 1, wherein receiving the request to use the camera of the computing device comprises one or more of (i) receiving a request to launch a camera application of the computing device or (ii) receiving a request to capture an image.

3. The computing device of claim 1, wherein the computing device is a first computing device further comprising a communication interface for communicating with a second computing device, wherein the second computing device comprises data storage having stored thereon a plurality of reference audio fingerprint items, and wherein using the stored audio fingerprint data to identify the reference audio content that has at least the threshold extent of similarity with the captured audio content comprises:

sending, to the second computing device, (i) the stored audio fingerprint data of the captured audio content and (ii) an instruction that causes the second computing device to compare the stored audio fingerprint data to the plurality of reference audio fingerprint items; and receiving, from the second computing device, an indication of a particular reference audio fingerprint item of the plurality of reference audio fingerprint items that has at least the threshold extent of similarity with the stored audio fingerprint data.

4. The computing device of claim 1, wherein using the stored audio fingerprint data to identify the reference audio content that has at least the threshold extent of similarity with the captured audio content comprises:

comparing the stored audio fingerprint data to a plurality of reference audio fingerprint items, wherein each respective reference audio fingerprint item is associated with respective reference audio content;

determining that a particular reference audio fingerprint item of the plurality of reference audio fingerprint items has at least the threshold extent of similarity with the stored audio fingerprint data; and identifying the reference audio content that has at least the threshold extent of similarity with the captured audio content as the respective reference audio content associated with the particular reference audio fingerprint item.

5. The computing device of claim 1, the set of acts further comprising:

identifying metadata associated with the identified reference audio content, wherein outputting the indication of the identified reference audio content comprises displaying an indication of the metadata associated with the identified reference audio content.

6. The computing device of claim 5, wherein the metadata comprises one or more of (i) a song title, (ii) an artist, (iii) a genre, (iv) an album title, or (v) a release year.

7. The computing device of claim 1, wherein outputting the indication of the identified reference audio content comprises outputting the reference audio content.

8. The computing device of claim 1, wherein the user input representing the selection of the captured image on the computing device comprises a request to view the captured image.

9. A method to be performed by a computing device, the method comprising:

detecting one or more predetermined phrases indicating a request to capture an image;

in response to detecting the one or more predetermined phrases indicating a request to capture an image, using a microphone of the computing device to capture audio content;

receiving a request to use a camera of the computing device;

in response to receiving the request, using the camera of the computing device to capture an image;

generating audio fingerprint data of the captured audio content;

storing the audio fingerprint data with the captured image on the computing device;

receiving a user input representing a selection of the captured image on the computing device;

in response to receiving the user input, using the stored audio fingerprint data to identify reference audio content that has at least a threshold extent of similarity with the captured audio content; and outputting an indication of the identified reference audio content while displaying the captured image.

10. The method of claim 9, wherein the computing device is a first computing device further comprising a communication interface for communicating with a second computing device, wherein the second computing device comprises data storage having stored thereon a plurality of reference audio fingerprint items, and wherein using the stored audio fingerprint data to identify the reference audio content that has at least the threshold extent of similarity with the captured audio content comprises:

sending, to the second computing device, (i) the stored audio fingerprint data of the captured audio content and (ii) an instruction that causes the second computing device to compare the stored audio fingerprint data to the plurality of reference audio fingerprint items; and receiving, from the second computing device, an indication of a particular reference audio fingerprint item of the plurality of reference audio fingerprint items that has at least the threshold extent of similarity with the stored audio fingerprint data.

11. The method of claim 9, wherein using the stored audio fingerprint data to identify the reference audio content that has at least the threshold extent of similarity with the captured audio content comprises:

comparing the stored audio fingerprint data to a plurality of reference audio fingerprint items, wherein each respective reference audio fingerprint item is associated with respective reference audio content;

determining that a particular reference audio fingerprint item of the plurality of reference audio fingerprint items has at least the threshold extent of similarity with the stored audio fingerprint data; and identifying the reference audio content that has at least the threshold extent of similarity with the captured audio content as the respective reference audio content associated with the particular reference audio fingerprint item.

12. The method of claim 9, the method further comprising:

identifying metadata associated with the identified reference audio content, wherein outputting the indication of the identified reference audio content comprises displaying an indication of the metadata associated with the identified reference audio content.

13. The method of claim 12, wherein the metadata comprises one or more of (i) a song title, (ii) an artist, (iii) a genre, (iv) an album title, or (v) a release year.

14. The method of claim 9, wherein the user input representing the selection of the captured image on the computing device comprises a request to view the captured image.

15. A non-transitory computer-readable medium, having stored thereon program instructions that, upon execution by a computing system, cause the computing system to perform a set of operations comprising:

detecting one or more predetermined phrases indicating a request to capture an image;

in response to detecting the one or more predetermined phrases indicating a request to capture an image, using a microphone of a computing device to capture audio content;

receiving a request to use a camera of the computing device;

in response to receiving the request, using the camera of the computing device to capture an image;

generating audio fingerprint data of the captured audio content;

storing the audio fingerprint data with the captured image on the computing device;

receiving a user input representing a selection of the captured image on the computing device;

in response to receiving the user input, using the stored audio fingerprint data to identify reference audio content that has at least a threshold extent of similarity with the captured audio content; and outputting an indication of the identified reference audio content while displaying the captured image.

16. The non-transitory computer-readable medium of claim 15, wherein the computing device is a first computing device further comprising a communication interface for communicating with a second computing device, wherein the second computing device comprises data storage having stored thereon a plurality of reference audio fingerprint items, and wherein using the stored audio fingerprint data to identify the reference audio content that has at least the threshold extent of similarity with the captured audio content comprises:

sending, to the second computing device, (i) the stored audio fingerprint data of the captured audio content and (ii) an instruction that causes the second computing device to compare the stored audio fingerprint data to the plurality of reference audio fingerprint items; and receiving, from the second computing device, an indication of a particular reference audio fingerprint item of the plurality of reference audio fingerprint items that has at least the threshold extent of similarity with the stored audio fingerprint data.

17. The non-transitory computer-readable medium of claim 15, wherein identifying the reference audio content that has at least the threshold extent of similarity with the captured audio content comprises:

comparing the stored audio fingerprint data to a plurality of reference audio fingerprint items, wherein each respective reference audio fingerprint item is associated with respective reference audio content;

determining that a particular reference audio fingerprint item of the plurality of reference audio fingerprint items has at least the threshold extent of similarity with the audio fingerprint data; and identifying the reference audio content that has at least the threshold extent of similarity with the captured audio content as the respective reference audio content associated with the particular reference audio fingerprint item.

18. The non-transitory computer-readable medium of claim 15, the set of operations further comprising:

identifying metadata associated with the identified reference audio content, wherein outputting the indication of the identified reference audio content comprises displaying an indication of the metadata associated with the identified reference audio content.

19. The non-transitory computer-readable medium of claim 18, wherein the metadata comprises one or more of (i) a song title, (ii) an artist, (iii) a genre, (iv) an album title, or (v) a release year.

20. The non-transitory computer-readable medium of claim 15, wherein the user input representing the selection of the captured image on the computing device comprises a request to view the captured image.

\* \* \* \* \*